(12) United States Patent
Leronseur

(10) Patent No.: US 8,479,856 B2
(45) Date of Patent: Jul. 9, 2013

(54) ARRANGEMENT FOR ATTACHING A FIRST COOLING DEVICE ON A SECOND COOLING DEVICE IN AN INTERNAL COMBUSTION ENGINE

(75) Inventor: Jean-Louis Leronseur, Villiers-Saint-Frederic (FR)

(73) Assignee: Renault S.A.S., Boulogne-Billancourt (FR)

( * ) Notice: Subject to any disclaimer, the term of this patent is extended or adjusted under 35 U.S.C. 154(b) by 230 days.

(21) Appl. No.: 13/120,296

(22) PCT Filed: Jun. 30, 2009

(86) PCT No.: PCT/FR2009/051271
§ 371 (c)(1),
(2), (4) Date: Jun. 8, 2011

(87) PCT Pub. No.: WO2010/034912
PCT Pub. Date: Apr. 1, 2010

(65) Prior Publication Data
US 2011/0240253 A1    Oct. 6, 2011

(30) Foreign Application Priority Data
Sep. 23, 2008  (FR) ...................................... 0856376

(51) Int. Cl.
*B60K 11/02*  (2006.01)
(52) U.S. Cl.
USPC ........................................ 180/68.4; 180/68.1
(58) Field of Classification Search
USPC .............................................. 180/68.1, 68.4
See application file for complete search history.

(56) References Cited

U.S. PATENT DOCUMENTS

| | | | | |
|---|---|---|---|---|
| 4,723,594 A * | 2/1988 | Koehr et al. | ..................... | 165/44 |
| 5,046,550 A * | 9/1991 | Boll et al. | ........................ | 165/41 |
| 5,721,473 A * | 2/1998 | DeVries | ........................ | 318/139 |
| 6,196,624 B1 * | 3/2001 | Bierjon et al. | ........... | 296/193.09 |
| 6,817,404 B2 * | 11/2004 | Frana-Guthrie et al. | ........ | 165/43 |
| 6,874,570 B2 * | 4/2005 | Horiuchi | ........................ | 165/140 |
| 7,150,335 B2 * | 12/2006 | Sasano et al. | ................. | 180/68.4 |
| 7,284,594 B2 * | 10/2007 | Sanada et al. | .................... | 165/41 |
| 7,814,963 B2 * | 10/2010 | Adamson et al. | ................ | 165/41 |
| 7,896,062 B2 * | 3/2011 | Adamson et al. | ................ | 165/41 |
| 7,963,355 B2 * | 6/2011 | Mishima | ..................... | 180/68.4 |
| 8,020,656 B2 * | 9/2011 | Inoue et al. | ................... | 180/68.4 |
| 8,365,809 B2 * | 2/2013 | Sugimoto et al. | ............... | 165/67 |

FOREIGN PATENT DOCUMENTS

| | | |
|---|---|---|
| DE | 102 33 859 | 1/2004 |
| DE | 103 15 095 | 10/2004 |
| DE | 10 2006 037 761 | 2/2008 |

OTHER PUBLICATIONS

International Search Report issued Dec. 29, 2009 in PCT/FR09/051271 filed Jun. 30, 2009.

* cited by examiner

*Primary Examiner* — Jeffrey J Restifo
(74) *Attorney, Agent, or Firm* — Oblon, Spivak, McClelland, Maier & Neustadt, L.L.P.

(57) ABSTRACT

An arrangement for attaching a first cooling group for cooling an internal combustion engine of an automobile, the group including a first device for cooling an engine coolant and a second device for cooling supercharging air. The first device is capable of interacting with the second device through shape cooperation so that the second cooling device assumes an intermediate retaining position on the first cooling device, and the first device can be automatically locked onto the second device by elastic fitting so that the second device assumes a final locked position on the first device.

8 Claims, 4 Drawing Sheets

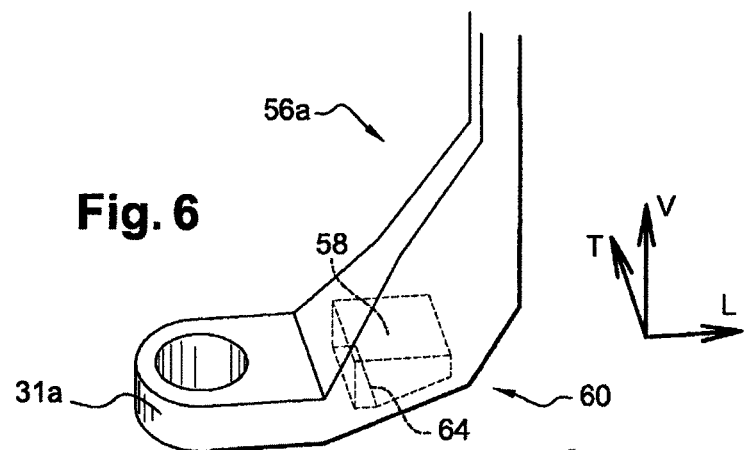
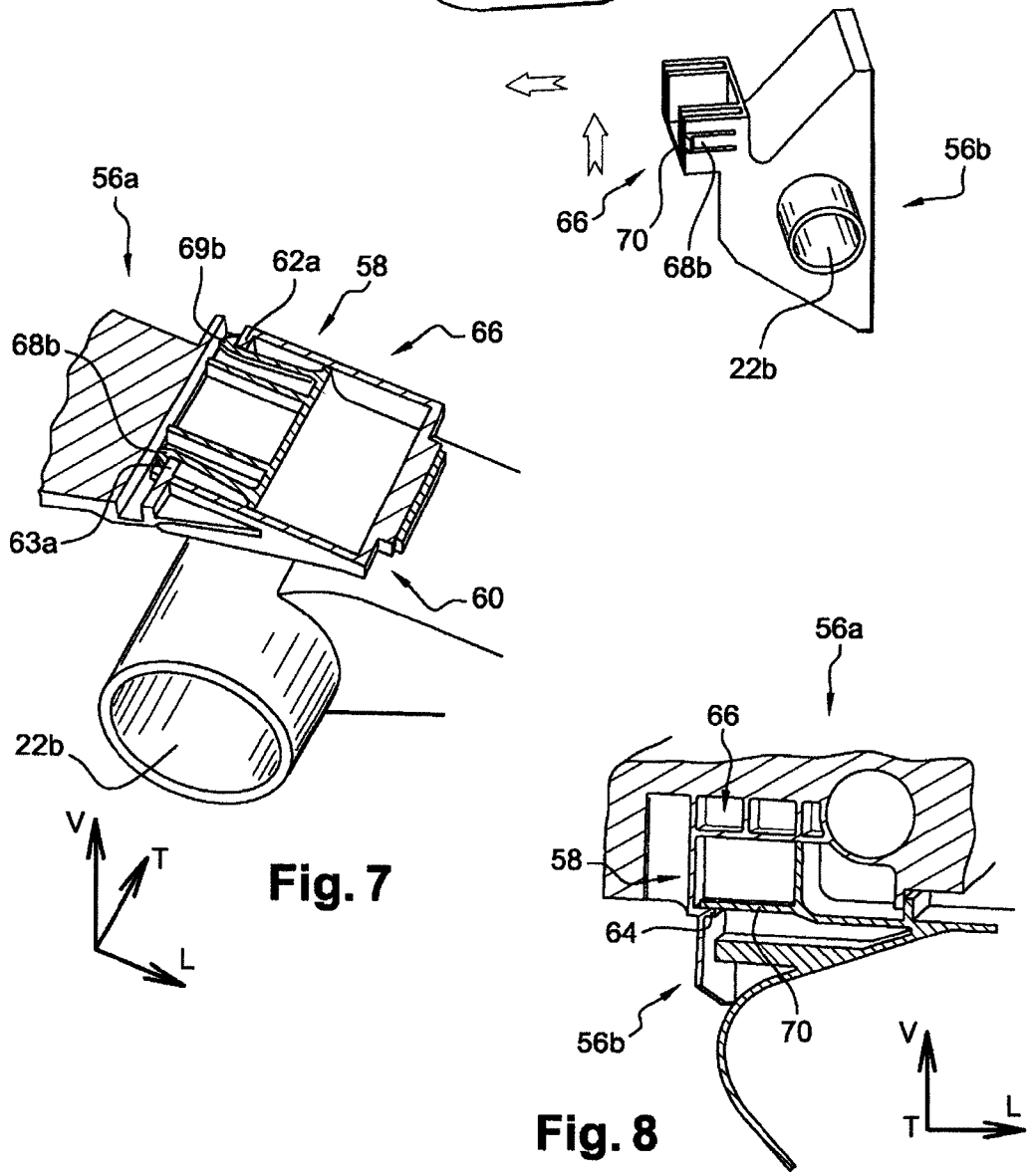
Fig. 6
Fig. 7
Fig. 8

ARRANGEMENT FOR ATTACHING A FIRST COOLING DEVICE ON A SECOND COOLING DEVICE IN AN INTERNAL COMBUSTION ENGINE

The invention relates to an arrangement for fixing a cooling system for cooling an internal combustion engine of an automobile vehicle, the system including:
- a first device for cooling an engine cooling liquid, which includes:
  - a globally parallelepiped shape first radiator unit that is delimited by a first lateral edge, a parallel second lateral edge and a third edge perpendicular to said first and second lateral edges,
  - a first lateral manifold that extends along the first lateral edge of the first radiator unit and includes a locking portion,
  - a second lateral manifold that extends along the second lateral edge of the first radiator unit and includes a retaining portion,
- a second device for cooling supercharging air, which includes:
  - a globally parallelepiped shape second radiator unit that is delimited by a first lateral edge, a parallel second lateral edge and a third edge perpendicular to said first and second lateral edges,
  - a first lateral manifold that extends along the first lateral edge of the second radiator unit and includes a locking portion,
  - a second lateral manifold that extends along the second lateral edge of the second radiator unit and includes a retaining portion.

Many arrangements are known in the art for fixing a first cooling device to a second cooling device, which devices constitute a cooling system or cooling unit for an internal combustion engine of an automobile vehicle.

The cooling system is generally disposed between the radiator grille and/or the bumper of the vehicle and the engine block so that the cooling system is subjected to a flow of cool air when the vehicle moves forward.

The first cooling device is generally stacked on top of the second cooling device.

The first cooling device is for example intended to cool by a flow of air a fluid of the internal combustion engine such as a cooling liquid or the oil of an internal combustion engine.

The first cooling device includes a first radiator unit that is disposed between a first or inlet manifold and a second or outlet manifold.

The fluid to be cooled flows from the first or inlet manifold to the second or outlet manifold of the first cooling device through the first radiator unit.

As is known in the art, the first radiator unit includes for example a bundle of pipes that is subjected to a flow of air to cool the liquid passing through it.

To this end, the radiator unit lies in a vertical plane orthogonal to the direction of the flow of air that is generated by the forward movement of the vehicle or by a fan.

The second cooling device is intended for example to cool by a flow of air the supercharging air that comes from a supercharger device such as a turbocompressor.

The second cooling device includes a second radiator unit that is disposed between a third or inlet manifold and a fourth or outlet manifold.

The supercharging air to be cooled flows from the third or inlet manifold to the fourth or outlet manifold of the second cooling device through the second radiator unit, which is subjected to a flow of air to cool the air passing through it.

Like the first radiator unit of the first cooling device, the second radiator unit of the second cooling device consists of a bundle of pipes, for example.

There is known in the art an arrangement for fixing the first cooling device to the second cooling device that consists in fixing the first device to the second device by screw means provided on the respective inlet and outlet manifolds of the cooling devices.

A variant replaces the screws with pegs or pins carried by the first device and each of which cooperates with a complementary hole of the second cooling device.

Such fixing, whether by screws, pegs or pins, is not entirely satisfactory because it necessitates attached parts, such as screws, and specific tools for screwing.

In order in particular to remedy these drawbacks, the invention proposes an arrangement for fixing the first cooling device to the second cooling device by means of cooperating shapes.

Moreover, the invention proposes to reduce the time to fix the first cooling module to the second cooling module.

To this end, the invention proposes an arrangement of the type described above characterized in that the retaining portion of the first cooling device is adapted to cooperate with the retaining portion of the second cooling device through cooperation of shapes, so that the second device occupies an intermediate retaining position on the first device, and the locking portion of the first device is adapted to be locked automatically onto the locking portion of the second device through elastic nesting so that the second device occupies a final locking position on the first device in which the third edge of the first device faces the third edge of the second device.

According to other features of the invention:
- the retaining portion of the first device includes a first plate and a T-shaped retaining finger a base branch of which extends perpendicularly from said first plate and a retaining head projects perpendicularly from said base branch of the finger, and the associated retaining portion of the second device includes a second plate delimiting a retaining notch adapted to be engaged around the base branch of the finger so that the second plate of the second device is disposed between the first plate of the first device and the head of the retaining finger, thanks to which the second cooling device occupies its intermediate retaining position on the first cooling device;
- the retaining portion of the first device includes an elastically deformable first element that extends perpendicularly from the first plate of the first device so that the second plate of the second device is clamped elastically between said elastically deformable first element and the head of the retaining finger, the elastic first member thus constituting first means for taking up play;
- the retaining portion of the second device includes an open retaining housing that is delimited by the second plate of the second device, and the head of the retaining finger is nested substantially without play in said retaining housing when the second device occupies its intermediate retaining position or its final position on the first device;
- the head of the retaining finger includes an elastically deformable second element that bears on an internal wall of the retaining housing, the second elastic element thus constituting second means for taking up play;
- the locking portion of the first device includes a locking housing that has an opening and includes at least one internal first locking tooth and the associated locking portion of the second device includes a locking head that is of complementary shape to the locking housing and includes at least one elastically deformable second locking tooth, the locking head being adapted to be nested in the locking housing so that the internal first tooth of the housing cooperates with the first tooth of the locking head to oppose withdrawal of the second device, thanks to which the second device occupies its final locking position on the first cooling device;

the locking housing is an open housing so that the locking head is adapted to be nested in said locking housing as far as the final locking position of the second device in which said locking head bears perpendicularly to the nesting direction against a threshold of the housing;

the locking portion of the first device is made in one piece with the associated first manifold, the retaining portion of the first device is made in one piece with the associated second manifold, the locking portion of the second device is made in one piece with the associated second manifold, and the retaining portion of the second device is produced in one piece with the associated second manifold.

Other features and advantages of the invention and design and production details will become apparent on reading the following detailed description, for an understanding of which see the appended drawings, in which:

FIG. 6 is a detail perspective view showing a left-hand first locking portion of the first or upper device and a left-hand second locking portion of the second or lower device;

FIG. 7 is a view in cross section showing the left-hand first locking portion from FIG. 6 nested in the left-hand second locking portion in a final locking position of the lower device;

FIG. 8 is a view in longitudinal section showing the left-hand first locking portion from FIG. 6 nested in the left-hand second locking portion in a final locking position of the lower device.

In the following description, identical, similar or analogous components or elements will be designated by the same reference numbers.

The terms vertical, horizontal, upper, lower have been adopted without reference to terrestrial gravity, and the terms longitudinal, vertical and transverse refer to the system of axes L, V, T indicated in the figures.

Figure 1:
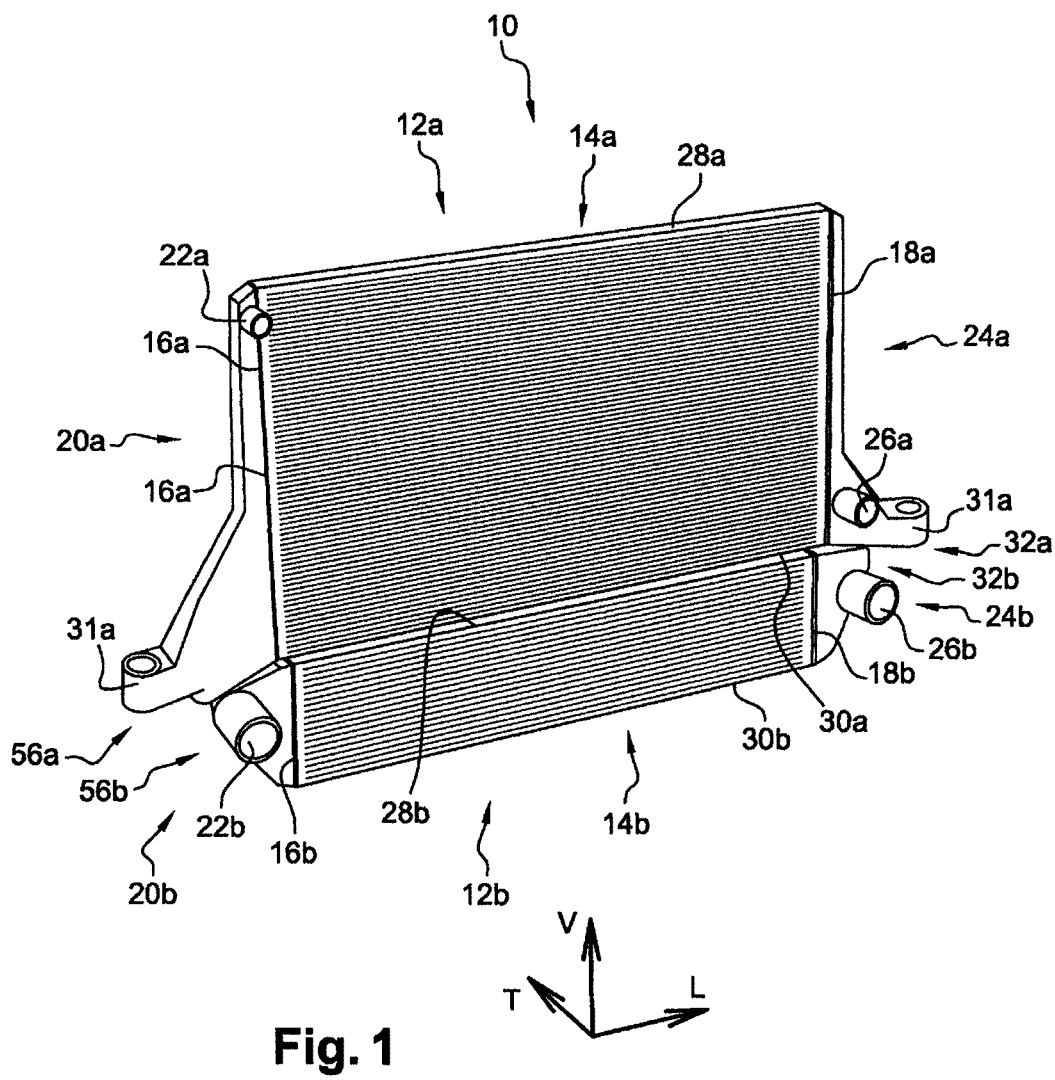
FIG. 1 is a diagrammatic perspective view showing a lower cooling device in a final locking position on an upper first cooling device of the invention.

Similarly, the terms left and right have been adopted with reference to the left-hand part and the right-hand part, respectively, of FIG. 1.

FIG. 1 represents a cooling system 10 for cooling an internal combustion engine (not shown) of an automobile vehicle.

The cooling system 10 includes a first or upper device 12a for cooling an engine cooling liquid and a second or lower device 12b for cooling supercharging air, for example supercharging air coming from a turbocompressor (not shown).

To facilitate an understanding of the description, in the remainder of the description components or elements relating to the upper device 12a are designated by a reference number followed by the letter "a".

Similarly, components or elements relating to the lower device 12b are designated by a reference number followed by the letter "b".

The upper cooling device 12a includes a first radiator unit 14a that is of parallelepiped shape and is delimited longitudinally on the left and on the right by a vertical left-hand first edge 16a and a vertical right-hand second edge 18a.

The upper device 12a includes a left-hand first manifold 20a, or water box, which is fixed to the left-hand first edge 16a of the radiator unit 14a and extends vertically from top to bottom.

Here the left-hand first manifold 20a is an inlet manifold that is fed with liquid to be cooled, for example engine cooling liquid, via a feed first orifice 22a.

Similarly, the upper device 12a includes a right-hand second manifold 24a that is fixed to the right-hand second edge 18a of the first radiator unit 14a and extends vertically from top to bottom.

Here the right-hand second manifold 24a is an outlet manifold that includes a liquid outlet first orifice 26a so that the liquid flows from the inlet left-hand first manifold 20a to the outlet right-hand second manifold 24a through the first radiator unit 14a, then escaping therefrom via the outlet first orifice 26a.

The upper cooling device 12a is delimited from the top to the bottom by an upper first edge 28a and a lower second edge 30a each of which extends horizontally and longitudinally from left to right.

Finally, each of the left-hand manifold 20a and the right-hand manifold 24a of the first device 12a includes a longitudinal lug 31a for fixing it to a structural element of the vehicle.

Similarly, the lower second cooling device 12b includes a second radiator unit 14b that is of parallelepiped shape and is delimited longitudinally from left to right by a vertical first edge 16b and a vertical right-hand second edge 18b.

The lower device 12b includes a left-hand first manifold 20b that is fixed to the left-hand first edge 16b of the associated second radiator unit 14b and extends vertically from top to bottom.

Here the left-hand first manifold 20b is an inlet manifold that is fed with supercharging air coming for example from a turbocompressor (not shown) via a feed second orifice 22b.

Similarly, the lower device 12b includes a right-hand second manifold 24b that is fixed to the right-hand second edge 18b of the second radiator unit 14b and extends vertically from top to bottom.

Here the right-hand second manifold 24b is an outlet manifold that includes an outlet second orifice 26b so that the supercharging air flows from the inlet left-hand first manifold 20b to the outlet right-hand second manifold 24b via the second radiator unit 14b, then escaping therefrom via the outlet second orifice 26b.

Moreover, the lower cooling device 12b is delimited from top to bottom by an upper first edge 28b and a lower second edge 30b each of which extends horizontally and longitudinally from left to right.

Figure 2:
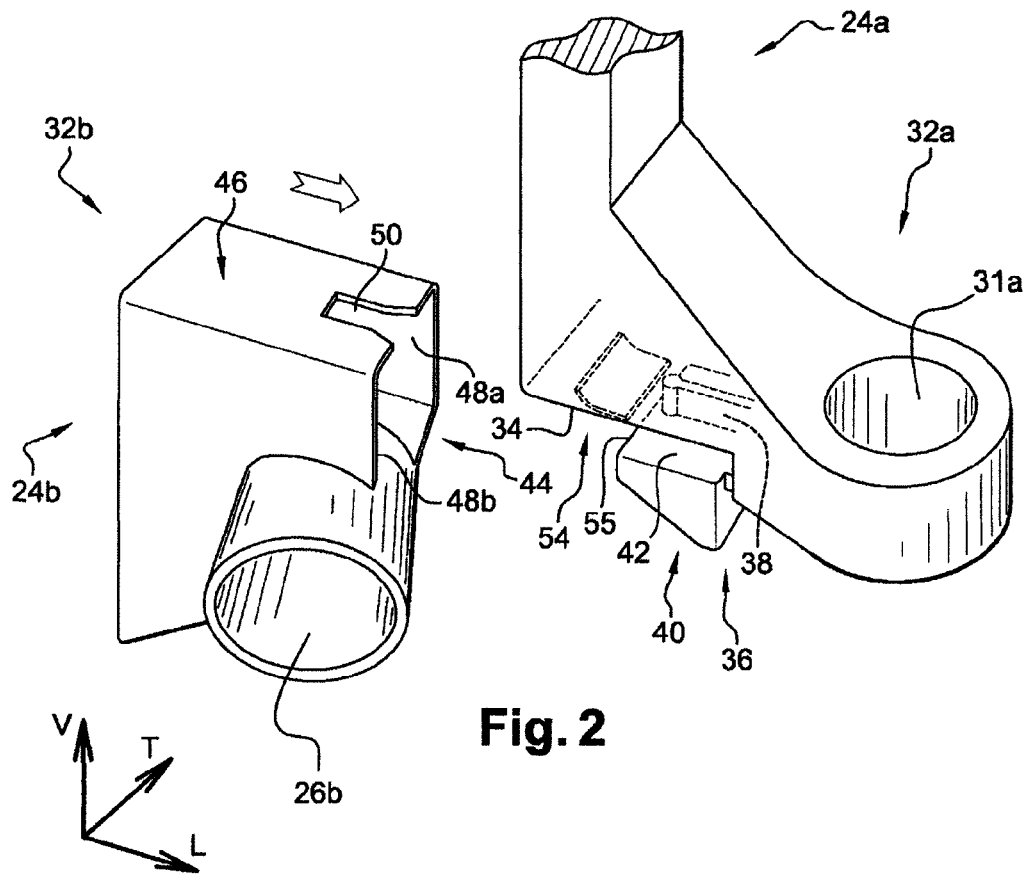
FIG. 2 is a detail perspective view showing a right-hand first retaining portion of a right-hand first manifold of the upper device and a right-hand retaining second portion of a right-hand second manifold of the lower device from FIG. 1.

FIG. 2 shows a right-hand first retaining portion 32a that is provided at a lower end of the right-hand manifold 24a of the upper first device 12a.

Here the right-hand first retaining portion 32a and the right-hand second manifold 24a are made in one piece from plastic material, for example by injection molding.

The right-hand first retaining portion 32a includes a horizontal lower plate 34 from which a retaining finger 36 extends downward.

The retaining finger 36 is T-shaped with a base branch 38 that extends vertically downward from the horizontal lower plate 34 as far as a retaining head 40.

The retaining head 40 projects horizontally from the base branch 38 of the finger 36 so that the head 40 has a horizontal upper face 42 facing the lower plate 34 of the right-hand second retaining portion 32a.

In complementary manner, the right-hand second manifold 24b of the lower device 12b includes at an upper end a right-hand second retaining portion 32b.

Here the right-hand second retaining portion 32b and the right-hand second manifold 24b are made in one piece from plastic material, for example by injection molding.

The right-hand second retaining portion 32b includes a housing 44 which is open toward the right, delimited at the top by a horizontal upper plate 46 and delimited transversely by an internal first wall 48a and a facing internal second wall 48b each of which extends vertically downward from the horizontal upper plate 46.

The upper plate 46 of the right-hand second retaining portion 32b delimits a retaining notch 50 that extends longitudinally so as to open into a right-hand transverse edge of the upper plate 46.

Figure 3:
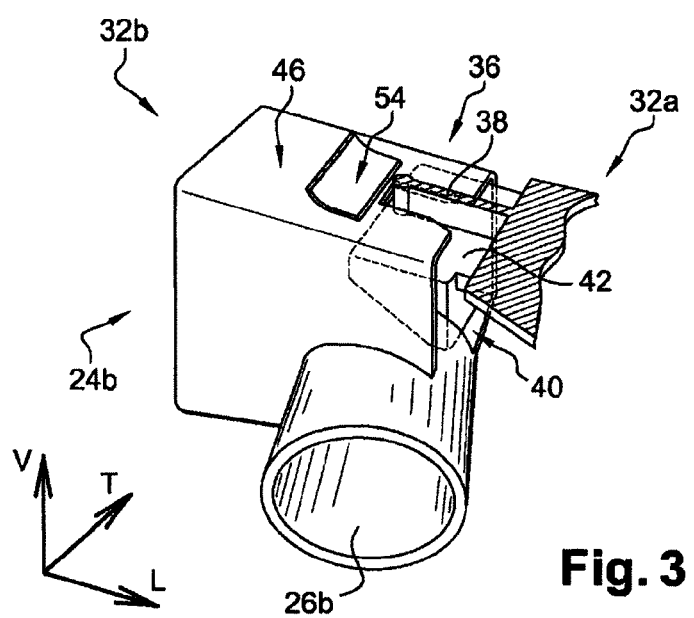
FIG. 3 is a detail perspective view showing the right-hand first retaining portion and the right-hand second retaining portion from FIG. 2 in a position retaining the lower device on the upper device.
Figure 4:
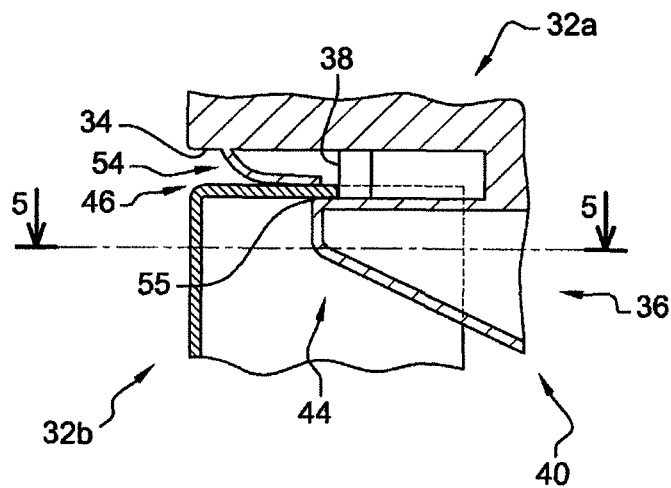
FIG. 4 is a view in longitudinal section showing the right-hand first retaining portion and the right-hand second retaining portion from FIG. 2 in a position retaining the lower device on the upper device.

Thus the notch 50 is adapted to be engaged from left to right around the base branch 38 of the finger 36 so that the upper plate 46 of the right-hand second retaining portion 32b is disposed vertically between the lower plate of the first retaining portion 32a and the head 40 of the retaining finger 36, thanks to which the lower cooling device 12b occupies an intermediate retaining or suspension position on the upper first cooling device 12a as may be seen in FIGS. 3 and 4.

Figure 5:
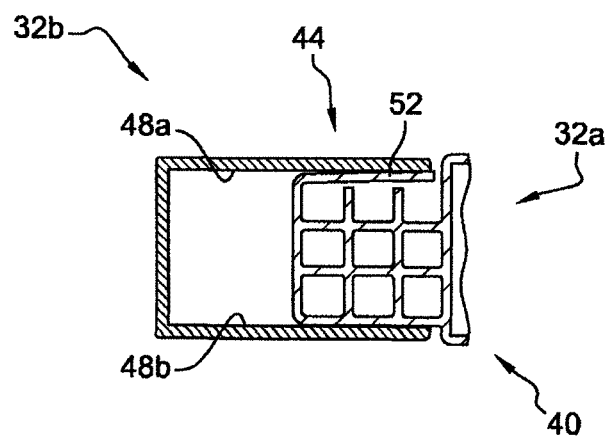
FIG. 5 is a view in cross section along the line 5-5 in FIG. 4 showing a retaining head of the right-hand first retaining portion nested in a complementary housing of the right-hand second retaining portion.

When the lower device 12b occupies its intermediate retaining position, the head 40 of the retaining finger 36 cooperates with the internal first wall 48a and the internal second wall 48b of the housing 44 so that the head 40 is nested substantially without transverse play in the retaining housing 44, as shown in FIG. 5.

To this end, the head 40 of the retaining finger 36 includes a vertical lateral tongue 52 that is elastically deformable and is pressed against the lateral internal first wall 48a of the retaining housing 44 so that the lateral tongue 52 constitutes means for taking up transverse play.

Moreover, the right-hand first retaining portion 32a includes an elastically deformable leaf spring 54 that extends substantially downward from the lower plate 34 so that the upper plate 46 of the right-hand second retaining portion 32b is clamped elastically between the leaf spring 54 and the retaining head 40 of the finger 36, the leaf spring 54 thus constituting means for taking up vertical play.

In its intermediate retaining position, the lower cooling device 12b is able to slide longitudinally relative to the upper cooling device 12a by virtue of the right-hand first retaining portion 32a sliding on the right-hand second retaining portion 32b.

Moreover, in its intermediate retaining position, the lower cooling device 12b is able to pivot substantially about a transverse axis relative to the upper cooling device 12a by virtue of elastic deformation of the deformable leaf spring 54.

The transverse pivot axis of the lower device 12b is here materialized by a left-hand upper edge 55 of the head 40 of the retaining finger 36.

Thus the leaf spring 54 facilitates engaging the notch 50 from left to right around the base branch 38 of the finger 36.

FIG. 6 shows a left-hand first locking portion 56a that is provided at a lower end of the left-hand first manifold 20a of the upper device 12a.

The left-hand first locking portion 56a and the left-hand first manifold 20a are here made of plastic material, for example by injection molding.

The left-hand first locking portion 56a delimits a locking housing 58 that is open longitudinally toward the right via a lower opening 60.

The opening 60 of the locking housing 58 is delimited at the bottom by a lower threshold 64 in the form of a transverse horizontal plate shown in FIG. 8.

As seen in FIG. 7, the locking housing 58 includes a first internal locking tooth 62a and a second internal locking tooth 63a that extend vertically facing the interior of the locking housing 58.

In a complementary way, the left-hand first manifold 20b of the lower device 12b includes at a lower end a left-hand second locking portion 56b.

The left-hand locking portion 56b and the left-hand manifold 20b of the lower device 12b are here made in one piece from plastic material, for example by injection molding.

The left-hand locking portion 56b of the lower device 12b includes a locking head 66 that is of complementary shape to the locking housing 58 of the upper device 12a so that the locking head 66 is adapted to be inserted longitudinally from right to left via the opening 60 of the associated locking housing 58.

The locking head 66 includes a third locking tooth 68b and a parallel fourth locking tooth 69b that extend vertically and longitudinally toward the left and are elastically deformable toward each other so that the third locking tooth 68b and the fourth locking tooth 69b are adapted to be moved transversely toward each other by elastic deformation.

Moreover, the locking head 66 is delimited at the bottom by a bearing 70 in the form of a horizontal plate arranged below the third tooth 68b and the fourth tooth 69b.

Thus the locking head 66 is adapted to be nested through the opening 60 of the locking housing 58 so that the first internal tooth 62a and the second internal tooth 63a of the locking housing 58 cooperate with the third tooth 68b and the fourth tooth 69b of the locking head 66 to oppose withdrawal of the lower device 12b to the right, thanks to which the lower device 12b occupies a final locking position on the upper cooling device 12a.

Moreover, the bearing 64 of the locking head 66 bears downward on the threshold 64 of the locking housing 60 to immobilize the locking head 66 against downward movement when the lower device 12b occupies its final locking position.

The locking head 66 is advantageously received substantially without transverse or vertical play in the associated locking housing 58.

Thus a user is able to interlock the upper device 12a and the lower device 12b in two simple movements without using additional tools.

In one example of use, the user executes a first movement that consists in moving the lower device 12b from left to right so that the notch 50 is engaged around the base branch 38 of the finger 36 until the lower device 12b occupies its intermediate retaining position.

The user then executes a second movement that consists in nesting the locking head 66 of the left-hand first locking portion 56b on the lower device 12b in the locking housing 58 of the left-hand first locking portion 56a of the upper device 12a until the lower device 12b occupies its final locking position.

During the second movement, the lower cooling device 12b slides substantially longitudinally toward the left relative to the upper cooling device 12a by virtue of sliding of the right-hand retaining portion 32a of the upper device 12a on the right-hand retaining portion 32b of the lower device so that the lower device 12b is retained on or suspended from the upper device 12a.

Of course, variants of the invention may be arrived at through simple mechanical reversals.

Similarly, the vertical and horizontal orientations are used by way of example without reference to terrestrial gravity.

It will be understood that the invention covers variants in which the upper cooling device 12a and the lower cooling device 12b are pivoted 90° about a transverse axis in FIG. 1 so that when the lower device 12b occupies its final locking position it is for example arranged on a lateral edge of the upper cooling device 12a.

The invention claimed is:

1. An arrangement for fixing a cooling system for cooling an internal combustion engine of an automobile vehicle, the system comprising:
    a first device for cooling an engine cooling liquid, which includes:
        a globally parallelepiped shape first radiator unit that is delimited by a first lateral edge, a parallel second lateral edge, and a third edge perpendicular to the first and second lateral edges,
        a first lateral manifold that extends along the first lateral edge of the first radiator unit and includes a first locking portion,
        a second lateral manifold that extends along the second lateral edge of the first radiator unit and includes a first retaining portion;
    a second device for cooling supercharging air, which includes:
        a globally parallelepiped shape second radiator unit that is delimited by a first lateral edge, a parallel second lateral edge, and a third edge perpendicular to the first and second lateral edges,
        a first lateral manifold that extends along the first lateral edge of the second radiator unit and includes a second locking portion,
        a second lateral manifold that extends along the second lateral edge of the second radiator unit and includes a second retaining portion;
    wherein the first retaining portion of the first cooling device is configured to cooperate with the second retaining portion of the second cooling device through cooperation of shapes, so that the second device occupies an intermediate retaining position on the first device, and the first locking portion of the first device is adapted to be locked automatically onto the second locking portion of the second device through elastic nesting so that the second device occupies a final locking position on the first device in which the third edge of the first device faces the third edge of the second device.

2. The arrangement claimed in claim 1, wherein the first retaining portion of the first device includes a first plate and a T-shaped retaining finger including a base branch that extends perpendicularly from the first plate, and a retaining head projects perpendicularly from the base branch of the finger, and the associated second retaining portion of the second device includes a second plate delimiting a retaining notch adapted to be engaged around the base branch of the finger so that the second plate of the second device is disposed between the first plate of the first device and the head of the retaining finger, whereby the second cooling device occupies its intermediate retaining position on the first cooling device.

3. The arrangement claimed in claim 2, wherein the first retaining portion of the first device includes an elastically deformable first element that extends perpendicularly from the first plate of the first device so that the second plate of the second device is clamped elastically between the elastically deformable first element and the head of the retaining finger, the elastic first member thereby constituting a first means for taking up play.

4. The arrangement claimed in claim 3, wherein the head of the retaining finger includes an elastically deformable second element that bears on an internal wall of the retaining housing, the second elastic element thereby constituting a second means for taking up play.

5. The arrangement claimed in claim 2, wherein the second retaining portion of the second device includes an open retaining housing that is delimited by the second plate of the second device, and the head of the retaining finger is nested substantially without play in the retaining housing when the second device occupies its intermediate retaining position or its final position on the first device.

6. The arrangement claimed in claim 1, wherein the first locking portion of the first device includes a locking housing that includes an opening and includes at least one internal first locking tooth, and the associated second locking portion of the second device includes a locking head that is of complementary shape to the locking housing and includes at least one elastically deformable second locking tooth, the locking head being configured to be nested in the locking housing so that the internal first tooth of the housing cooperates with the first tooth of the locking head to oppose withdrawal of the second device, whereby the second device occupies its final locking position on the first cooling device.

7. The arrangement claimed in claim 6, wherein the locking housing is an open housing so that the locking head is configured to be nested in the locking housing as far as the final locking position of the second device in which the locking head bears perpendicularly to the nesting direction against a threshold of the housing.

8. The arrangement claimed in claim 1, wherein the first locking portion of the first device is made in one piece with the associated first manifold, the first retaining portion of the first device is made in one piece with the associated second manifold, the second locking portion of the second device is made in one piece with the associated second manifold, and the second retaining portion of the second device is produced in one piece with the associated second manifold.

* * * * *